Patented Mar. 6, 1928.

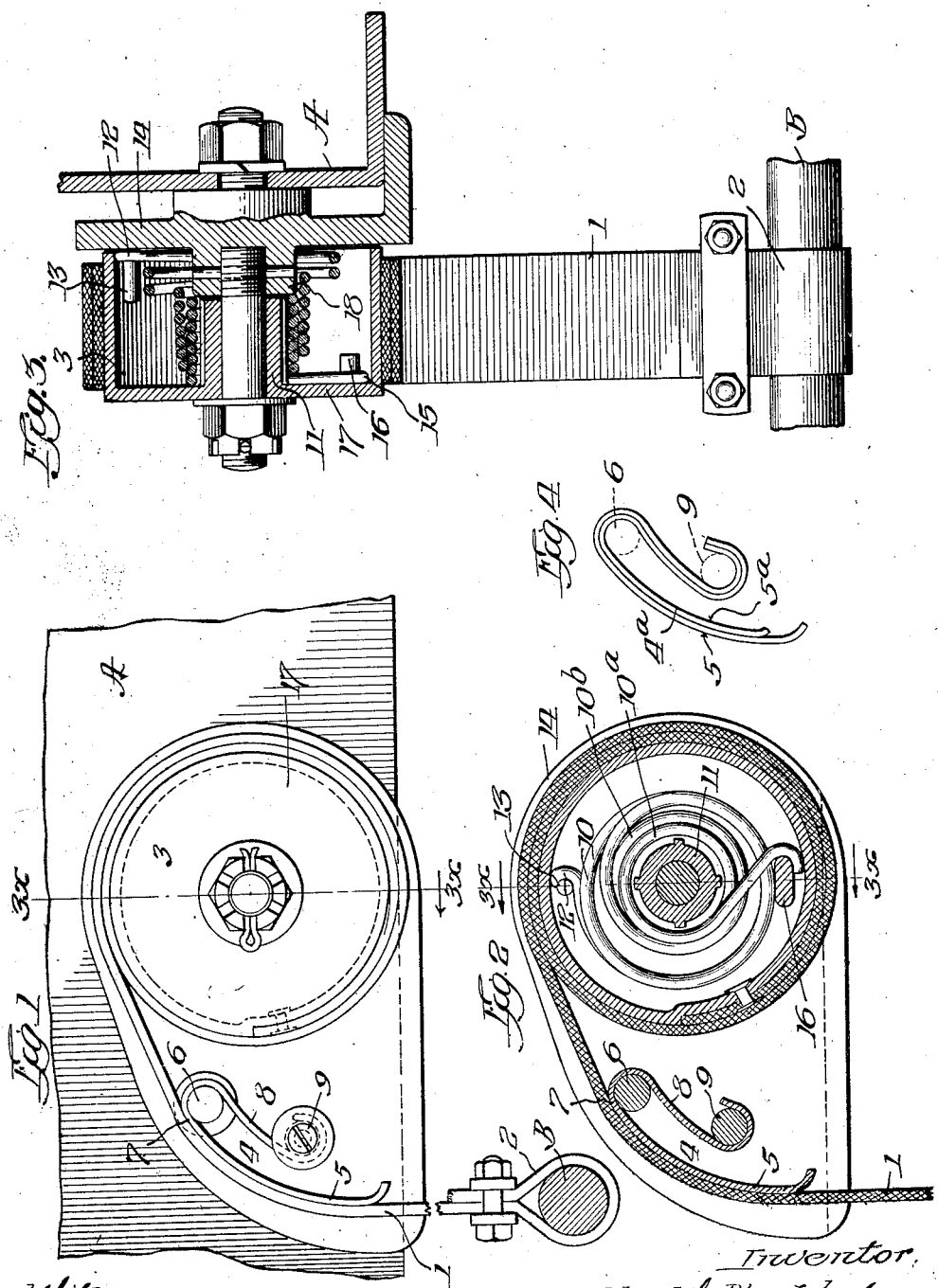

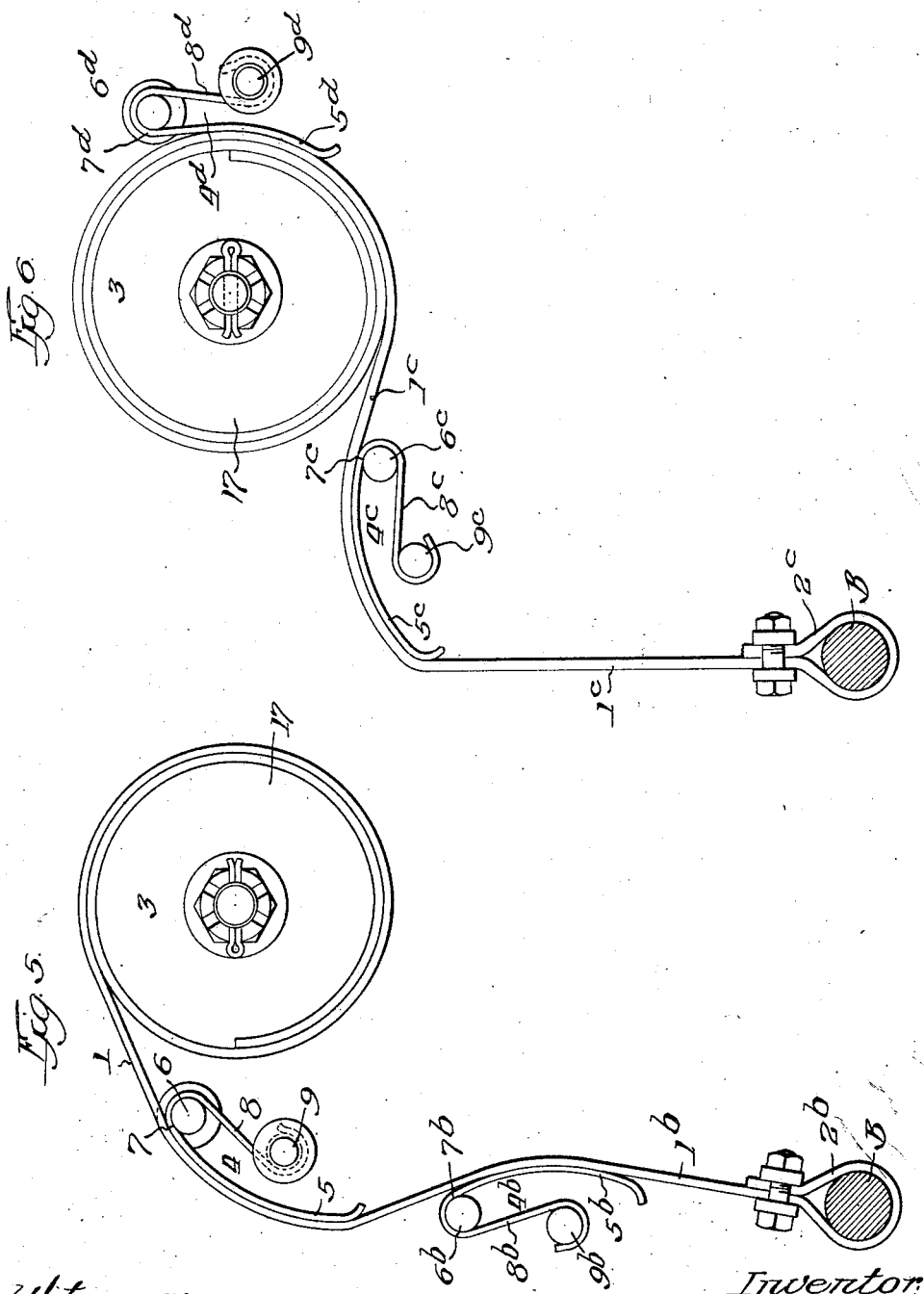

1,661,650

UNITED STATES PATENT OFFICE.

JOHN W. BLACKLEDGE, OF CHICAGO, ILLINOIS.

VEHICLE-SPRING REGULATOR.

Application filed June 24, 1925. Serial No. 39,208.

This invention relates to a device to be applied to a vehicle in position to prevent violent reaction of springs that would normally occur when suddenly compressed by passage of the vehicle over uneven surfaces; and particularly to a spring regulator of that type in which a suitable connector has one of its ends attached to one of two spring-connected vehicle members, for instance, the axle of the vehicle, while its other end is connected with a resilient take-up device mounted on the other vehicle member, and an intermediate portion of the connector is deflected from a straight path by a friction member over which the connector drags and by which paying out of the connector, at the time of recoil, is sufficiently retarded to avoid violent reaction of the spring.

One well known embodiment of the above described principle in a spring regulator consists of a flexible strap connected at one end near the axle of the vehicle and having its other end wound upon a spring driven drum which is mounted upon the chassis frame of the vehicle, while a rigid cylindrical surface also mounted on the chassis frame to one side of the spring drum provides the frictional deflecting surface over which the strap drags. But there are several objections to this arrangement, growing out of the fixed and unyielding character of the friction element, which it is the object of the present invention to eliminate, and chief among which are lack of flexibility, particularly under the reaction resulting from slight surface disturbances, and sluggishness in the take-up of the flexible connector during the compression part of the spring action; and these objections are overcome by the present invention by incorporating in the deflecting frictional element a suitable degree of resiliency in the direction of deflection, so that minor disturbances in the spring equilibrium will be largely, if not wholly, taken up by the deflecting member without the necessity of overcoming the winding spring of the drum, and in case of tardiness of the spring drum in overcoming friction of the deflector and winding up of the connector during downward movement of the vehicle body, the resultant slack in the connector will be taken up by reaction of the resilient deflector. Preferably, the deflector is graduated in its resiliency from one end toward the other, even to the degree, if desired, of having one end rigid and stationary and the other end floating or free, for instance, by making the frictional deflector out of a plate spring projecting from a fixed stud providing the deflector with a friction-strap engaging surface extending from its point of support to its free end, and locating the deflector in a position which causes it to bend under the tension of the connector and seek to straighten out under any slackening of the connector. Aside from advantages realized from its operative principle, such form of deflector is particularly advantageous because of the readiness with which it can be mounted in position, for instance, by providing it with a projecting portion extending beyond its supporting stud and engaged over another stud in a manner to resist rotation of the deflector around the supporting stud; and still another advantage of such a construction arises from the ease with which the strength of the deflector can be gauged, as, for instance, by making it of plate spring material of more than one ply.

In the accompanying drawing—

Figure 1 is a side elevation of a portion of a vehicle chassis frame and a related axle to which the preferred embodiment of the present invention is shown applied.

Figure 2 is a sectional view in a plane parallel to that of Figure 1.

Figure 3 is a section on the line $3^x$—$3^x$ of Figures 1 and 2.

Figure 4 is a view showing a modification of the plate spring deflecting device; and Figures 5 and 6 show further uses thereof.

A represents a portion of the chassis frame of a vehicle and B the axle thereof. 1 represents a flexible connector constructed at one end with a loop 2 through which it is attached to the axle B, and having its other end wound upon a spring drum 3. The intermediate portion of the connector is caused to assume a circuitous path by a deflector 4 over which the connector drags in a manner to develop large frictional resistance to the movements of the connector, particularly when being paid out by the drum 3 during upward movement of the chassis frame under reaction of the springs, the deflector and spring drum being both mounted upon the chassis frame A. Deflector 4 consists of a plate spring 5 looped about a fixed pin 6 which affords a stationary portion 7 of the deflector while leaving the main body of the deflector free for resilient action in the direction of deflection of the connector. The deflector is prevented from rotating upon the pin 6 by means of the anchoring end 8 which is looped about the stud 9. Deflector 4 is resilient throughout the greater portion of its length by reason of the inherent quality of the plate spring of which it is constructed, and the fact that its end 5 is substantially free from restraint; but this resilience gives place to substantial rigidity at the point 7. In other words, resiliency increases from the point 7 to the end of the portion 5, or varies from end to end of the deflector and throughout a sufficient extent thereof to take up and yield a material portion of the length of the connector, so that under minor disturbances of the spring, such as result from slight unevenness in the surface over which the vehicle travels, the take-up and paying out of the connector may be largely or wholly restricted to the resilient deflector.

Another advantage of constructing the frictional deflector with its sustaining means at one end and its other end free to deflect, and thereby graduating the flexibility from end to end, is that the increase in yield of the deflector toward its free end curves the deflector and thereby graduates the clinging or frictional effect between the connector and the deflector, according to the severity of recoil. That is to say, under the tension of recoil resulting from a severe compression of the vehicle spring, the deflector will be curved to a shorter radius and the friction will be proportionately increased.

One advantage of the present invention arises from the fact that the deflector, constructed as herein described, may constitute a separate article of manufacture, to be introduced or replaced at will, in situations corresponding substantially to that in which the device is herein illustrated.

If desired, the resistance of the deflector may be gauged by making it of multiple ply, as shown at $4^a$ in Figure 4, as, for instance, by introducing one or more additional plate springs $5^a$ fashioned to conform to the spring 5, and looped about the studs 6 and 9 in the manner already described in connection with Figures 1 and 2.

As shown in Figures 2 and 3, the spring 10 of drum 3 may consist of superposed coils, for instance, an inner coil $10^a$ loosely wound about the hub 11 of the drum 3, and an outer coil $10^b$ surrounding the coil $10^a$; one end 12 of the spring being anchored to the fixed pin 13 on the bracket 14, and the other end 15 of the spring being engaged with the stud 16 on the inner wall of the drum. The convolutions of the inner coil $10^a$ are preferably sufficient in number to cause the spring to wedge in between the end wall 17 of the drum and the opposed wall of the bracket 14, the spring being enlarged around the hub 18, in the manner and for the purposes set forth in United States Letters Patent No. 1,377,613, that were issued May 10, 1921, to the present inventor.

The invention contemplates the use of the deflector herein described in positions other than that shown in Figures 1 and 2. For instance, as shown at $4^b$ in Figure 5, a deflector and its mounting, consisting of the elements $5^b$, $6^b$, $7^b$, $8^b$, and $9^b$, each of which corresponds in construction and function to the elements indicated in Figures 1 and 2 by the same numerals minus the exponents, may be located beyond the deflector 4, occupying substantially the same position in Figure 5 as the deflector in Figures 1 and 2; and the strap 1 may be provided with an extension $1^b$ in frictional relation to the deflector $4^b$, with the effect of increasing the drag upon the strap, particularly when the tension is great, and increasing the capacity to absorb minor stresses on the strap resulting from body vibrations of lesser amplitude. The deflector may likewise be located in the position illustrated at $4^c$ in Figure 6, where, with its elements $5^c$, $6^c$, $7^c$, $8^c$, and $9^c$ constructed and functioning substantially as in the deflector 4 of Figures 1 and 2 but located to receive the strap $1^c$ paid out as a tangent from the bottom of the spring drum 3 and developing a much greater angle of deflection at the free end $5^c$, the frictional drag and absorption of energy from lesser body vibrations is substantially greater than in Figures 1 and 2.

The deflector when constructed and mounted substantially as hereinbefore described, may even be employed in a position where it will serve as a peripheral brake for the spring drum, for instance, as shown at $4^d$ in Figure 6, where the elements of the deflector and its mounting, indicated by the characters $5^d$, $6^d$, $7^d$, $8^d$, and $9^d$, are arranged to present the free resilient portion $5^d$ in frictional contact with that portion of the strap $1^c$ which is wound upon the brake drum.

Important features of the present invention, in addition to those already enumerated, are that in the several relations herein described, the deflector by acting resiliently against the strap, takes up slack therein and remains in frictional control of the strap at all times, thereby retarding movement of the strap in both directions in which the strap travels. Thus, the deflector not only assists the spring drum in opposing initial reaction of the body springs and limiting upward recoil of the body, but prevents the spring drum from jerking the body downward after the body reaches the limit of its upward recoil and leaves the weight of the body as the only influence in bringing the body back from such upward limit to its normal level of spring support. Without the resilient deflector, the spring drum, acting through the strap, would develop unpleasant jerky effect upon the car body, and particularly in moving downward from the upper limit of recoil. Again, the resilient deflector has strength enough to instantly take up slack of the strap resulting from depression of the car body, which results from the numerous minor vibrations of car springs, thereby keeping the strap taut at all times. Slackening of the strap momentarily reduces friction so that the deflector can instantly recover from the deflection to which it is held by the strap under tension, and thereby take up slack in the strap.

I claim:

1. A vehicle spring regulator, comprising a flexible connector adapted to be attached to one of two spring connected vehicle members, a resilient take-up device for said connector adapted to be mounted on the other of said vehicle members, and a deflector adapted to be mounted on the same vehicle member that carries the take-up device, and presenting a frictional surface over which the connector travels during relative movement of the vehicle members; said deflectors deflecting the connector into a circuitous path and being resilient in the direction of such deflection.

2. In a vehicle spring regulator, a flexible connector adapted to be attached to one of two spring connected vehicle members, a resilient take-up device adapted to be mounted on the other of said vehicle members and keep said connector taut during relative movement of the vehicle members, and a deflector located to deflect the connector from a straight line and impose frictional resistance to the movement of the connector; said deflector being resilient in the direction of such deflection.

3. Means for regulating the reaction between two spring connected vehicle members, comprising a flexible connector adapted to be connected at one end to one such vehicle member, a resilient take-up device for said connector adapted to be mounted on the other such vehicle member for keeping the connector taut during relative movement between such members, and a deflector deflecting said connector into a circuitous path and presenting thereto a friction surface elongated in the direction of connector movement; said deflector having resiliency in the direction of deflection which is graduated from one end to the other of said surface.

4. Means for regulating the spring action between two spring connected vehicle members, comprising a flexible connector, a take-up device keeping said connector under tension, and a deflector deflecting the connector into a circuitous path and imposing frictional resistance to its movements; portions of said deflector being, respectively, unyielding and yielding in the direction of deflection under the tension of the connector.

5. Means for regulating spring action between two spring-connected vehicle members, comprising a flexible connector, a take-up device keeping said connector under tension during spring action, and a deflector mounted in fixed relation to said take-up device, presenting a frictional surface over which the flexible connector travels and deflecting said connector into a circuitous path; said deflector comprising a spring member having a fixed support at one end and having its other end free to yield in the direction of deflection under the tension of the connector.

6. Means for regulating reaction beween two spring-connected vehicle members, comprising a flexible connector constructed for fixed anchorage, at one end, to one of said members, a take-up device keeping said connector under tension during spring action, and a deflector deflecting said connector into a circuitous path, said take-up device and deflector being both constructed for mounting upon the other of said members; said deflector consisting of a fixed support and a plate spring looped about said support, extending therefrom in the path of the connector, and terminating in an end that is free to yield in the direction of deflection under the tension of the connector.

7. Means for regulating reaction between two spring-connected vehicle members, comprising a flexible connector, a take-up device for keeping said connector under tension during spring action, and a deflector deflecting the connector into a circuitous path; said deflector consisting of fixed studs and a plate spring looped about said studs and having a free resilient end projecting from one of said studs in the path of the connector with freedom to yield in the direction of deflection under the tension of the connector.

8. Means for regulating reaction between two spring-connected vehicle members, comprising a flexible connector, a take-up device for keeping said connector under tension during spring action, and a deflector deflecting the connector into a circuitous path; said deflector consisting of fixed studs and a plate spring looped about said studs and having a free resilient end projecting from one of said studs in the path of the connector with freedom to yield in the direction of deflection under the tension of the connector; the stud last referred to being also in the path of the deflector and holding immovable the portion of the spring which is in engagement therewith.

9. As a new article of manufacture, a frictional brake for sliding straps of spring regulators, comprising a plate spring having at one end means for engaging a suitable support, an anchoring portion projecting from said end for engagement with means to resist rotation of the brake upon its support, and having a flexible body portion extending from said supporting end and terminating in a free and unsupported end.

10. As a new article of manufacture, a deflector for brake regulators, comprising a plate spring bent to form a pin-embracing loop, a body portion extending from said loop and terminating in a free end, said body portion being constructed with a friction-strap receiving surface extending from the loop to the free end, and a resilient anchoring portion extending from said loop and provided with means for engaging an anchoring pin and thereby holding the deflector against rotation.

Signed at Chicago, Illinois, this 16th day of June, 1925.

JOHN W. BLACKLEDGE.